(12) United States Patent
Miller et al.

(10) Patent No.: US 8,289,145 B2
(45) Date of Patent: Oct. 16, 2012

(54) WIRELESS SEATBELT MONITORING SYSTEM

(75) Inventors: Ronald Hugh Miller, Saline, MI (US); Aric David Shaffer, Ypsilanti, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 524 days.

(21) Appl. No.: 12/463,769

(22) Filed: May 11, 2009

(65) Prior Publication Data

US 2010/0283593 A1 Nov. 11, 2010

(51) Int. Cl.
*B60Q 1/00* (2006.01)

(52) U.S. Cl. ..................... 340/457.1; 340/457

(58) Field of Classification Search .................. 340/457, 340/457.1, 445, 447, 426.13–426.18, 426.36, 340/506, 687; 701/34, 36, 45; 280/728.1, 280/734, 801.1; 180/268, 271; 455/7, 16
See application file for complete search history.

(56) References Cited

U.S. PATENT DOCUMENTS

| | | | |
|---|---|---|---|
| 5,317,303 A | 5/1994 | Ross et al. | |
| 6,535,116 B1 | 3/2003 | Zhou | |
| 6,700,310 B2 | 3/2004 | Maue et al. | |
| 6,888,475 B2 * | 5/2005 | Darr | 340/945 |
| 6,924,742 B2 * | 8/2005 | Mesina | 340/573.1 |
| 7,002,457 B2 | 2/2006 | Stevenson et al. | |
| 7,005,976 B2 * | 2/2006 | Hagenbuch | 340/457.1 |
| 7,126,497 B2 | 10/2006 | Face et al. | |
| 7,145,448 B2 * | 12/2006 | Tanaka et al. | 340/457.1 |
| 7,265,671 B1 * | 9/2007 | Valles et al. | 340/541 |
| 7,430,397 B2 * | 9/2008 | Suda et al. | 455/7 |
| 7,446,652 B2 * | 11/2008 | Hagenbuch | 340/457.1 |
| 7,813,856 B2 * | 10/2010 | McCall et al. | 701/45 |
| 2002/0028655 A1 * | 3/2002 | Rosener et al. | 455/16 |
| 2003/0167139 A1 * | 9/2003 | Swartz et al. | 702/65 |
| 2005/0061568 A1 | 3/2005 | Schondorf et al. | |

* cited by examiner

*Primary Examiner* — Van T. Trieu

(74) *Attorney, Agent, or Firm* — Frank A. MacKenzie; Brooks Kushman P.C.

(57) ABSTRACT

A wireless seatbelt monitoring system and method is provided for informing a driver that a seatbelt that should be latched is unlatched. The system includes a wireless seatbelt assembly having a buckle equipped with a piezoelectric element and a transmitter. The transmitter sends a wireless seatbelt status signal when the seatbelt assembly is buckled by harvesting energy during the insertion process. The wireless seatbelt status signal is transmitted to a dedicated repeater module, which retransmits the wireless seatbelt status signal to a receiver. Based upon the wireless seatbelt status signal, the system informs the driver of the status of the seatbelt assemblies audibly, visually, or both.

20 Claims, 4 Drawing Sheets

WIRELESS SEATBELT MONITORING SYSTEM

TECHNICAL FIELD

The following relates to a wireless seatbelt monitoring system and method for alerting a driver of a vehicle when a seatbelt is unlatched, and more particularly to a wireless seatbelt monitoring system and method employing a repeater module to reliably transmit wireless seatbelt status signals to a receiver.

A detailed description and accompanying drawings are set forth below.

DETAILED DESCRIPTION

Figure 1:
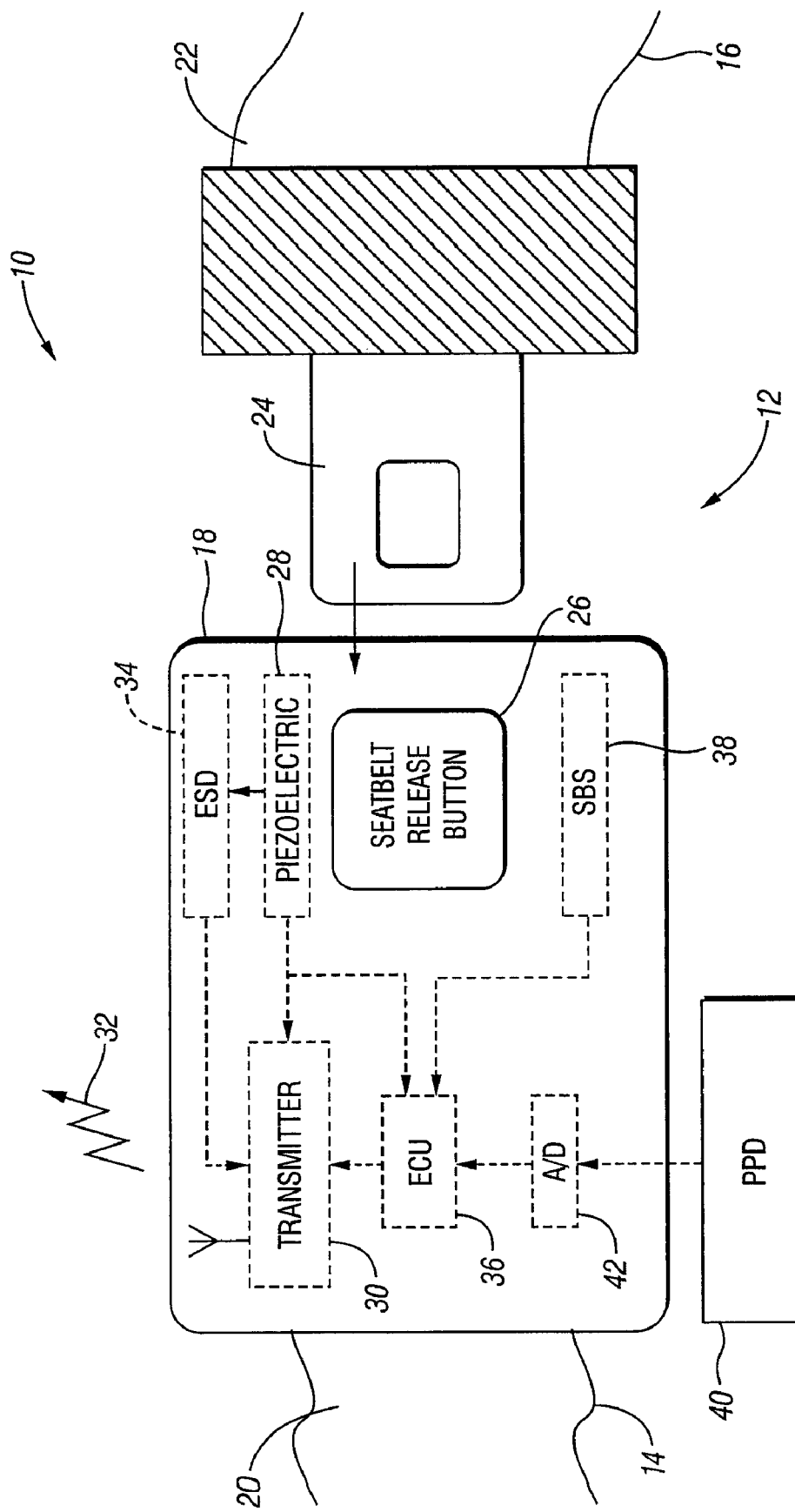
FIG. 1 is a simplified, exemplary diagram of a wireless seatbelt assembly according to one or more embodiments of the present application.

As required, detailed embodiments of the present application are disclosed herein. However, it is to be understood that the disclosed embodiments are merely exemplary of the invention that may be embodied in various and alternative forms. The figures are not necessarily to scale, and some features may be exaggerated or minimized to show details of particular components. Therefore, specific structural and functional details disclosed herein are not to be interpreted as limiting, but merely as a representative basis for teaching one skilled in the art to variously employ the teachings of the present application.

Seatbelts are nearly universally required in motor vehicles. The sole purpose for having seatbelts in motor vehicles is to provide occupant safety. A seatbelt is a safety harness designed to secure an occupant of a vehicle against harmful movement that may result from a collision or a sudden stop. As part of an overall occupant restraint system, seatbelts are intended to reduce injuries by stopping the wearer from hitting hard interior elements of the vehicle or other passengers (the so-called second impact) and by preventing the passenger from being thrown from the vehicle. Seatbelts are credited with saving thousands of lives by reducing both the quantity and the severity of injuries occurring in thousands of motor vehicle accidents each year. Furthermore, the National Highway Traffic and Safety Administration (NHTSA) estimates that thousands more U.S. car accident fatalities would have been avoided if the victims had been wearing seatbelts. Often, when an accident occurs, the first thought of an occupant is the status of his or her seatbelt.

Many automotive passenger vehicles come equipped with a wired front seatbelt monitoring system that determines whether the front passenger seatbelt is latched or unlatched each time the vehicle ignition is turned on. An audible and/or visual reminder warning is typically provided when the front seatbelt monitoring system determines that a front passenger seatbelt is not latched. Should a driver wish to determine the seatbelt buckle status of an occupant in a rear passenger seat, typically the driver must visually inspect the seatbelt buckle, usually from the driver's seat, or query the occupant. Visual verification of rear seatbelt buckle status from the driver's seat can be cumbersome, difficult, and potentially dangerous. Moreover, querying an occupant in a rear passenger seat as to the status of the seatbelt can be unreliable, particularly if the occupant is a child.

In some vehicles, the conventional front seatbelt monitoring system has been expanded to include monitoring the status of rear occupant seatbelts as well. The monitoring systems commonly used today are electronically-implemented systems that include circuitry at the seatbelt buckle which is hardwired to an operator signaling device at the instrument panel to produce the audible and/or visual warning. Conventional occupant detection and seatbelt warning systems include hardwired Hall Effect buckle sensors and capacitive seat sensors or the like having long cut lead wires. An additional electronic control unit (ECU) equipped with multiple inputs is needed as well as an additional connection to the vehicle's smart junction box (SJB). Such systems increase vehicle wiring, system complexity, and cost. With the advent of articulating and removable rear occupant seats, employing a hardwired seatbelt monitoring system for the rear seats can be problematic.

With reference to FIGS. 1-4, a more detailed description of one or more embodiments of a wireless seatbelt monitoring system and method and various components thereof will now be provided. The wireless seatbelt monitoring system can determine whether a seatbelt buckle associated with a rear passenger seat is in a latched or unlatched state. The status of the seatbelt buckle may then be communicated to the driver. Existing vehicle architecture can largely be used to employ the wireless seatbelt monitoring system described herein.

Referring to FIG. 1, a wireless seatbelt system 10 according to one or more embodiments of the present application is shown. As seen therein, the wireless seatbelt system 10 may include a wireless seatbelt assembly 12 having a first strap (or webbing) 14 and a second strap (or webbing) 16 that can be secured together with a buckle 18 to form a restraint. The first strap 14 may be of a fixed length and include a fixed end (not shown) anchored to a vehicle seat, floor, or the like. The buckle 18 may be affixed to a free end 20 of the first strap 14. The second strap 16 likewise includes a fixed end (not shown) and a free end 22. The fixed end of the second strap, however, may be attached to a retractor mechanism (not shown) that, in turn, is mounted to the vehicle seat, floor, or other rigid member. The second strap 16 can be much lengthier than the first strap 14 to allow for adjustments in the length of the seatbelt assembly 12. The retractor mechanism may include a spool that is attached to the fixed end of the second strap 16. The retractor mechanism may also include a spring that applies a rotational force, or torque, to the spool, which works to rotate the spool so it winds up any loose webbing, thereby eliminating any remaining slack in the seatbelt assembly 12. The retractor mechanism may include a locking mechanism that stops the spool from rotating when the vehicle rapidly is decelerated, such as in a collision. A tongue 24 may be affixed to the free end 22 of the second strap 16. The tongue 24 can be inserted into the buckle 18 securing the first strap 14 to the second strap 16 causing the seatbelt assembly 12 to be in a latched state. The seatbelt assembly 12 can remain in the latched state until a seatbelt release button 26 is manipulated by a user that causes the buckle 18 to release the tongue 24, thereby unlatching the seatbelt assembly 12. Although the seatbelt assembly 12 shown in FIG. 1 depicts a lap seatbelt, other types of seatbelts known to one of ordinary skill in the art are fully contemplated without departing from the scope of the present application, such as lap and sash belts, three-point seatbelts, five-point harnesses, or the like.

According to one or more embodiments of the present application, electronic and/or electro-mechanical components may be contained within the seatbelt buckle 18. For example, the buckle 18 may include a piezoelectric element 28 capable of converting mechanical energy into electrical energy. More specifically, the piezoelectric element 28 can generate an electric potential in response to mechanical stress applied to the piezoelectric element 28 during an insertion process of the tongue 24 into the buckle 18. The piezoelectric element 28 may be positioned relative to the tongue 24 such that the tongue's movement during insertion into the buckle 18 imparts a mechanical force onto the piezoelectric element 28 that results in an electrical signal being produced by the piezoelectric element 28. The electrical energy harvested during the insertion process may be used to feed the electrical signal to a transmitter 30. The electrical signal fed to the transmitter 30 may instruct the transmitter 30 to emit a wireless signal from the buckle 18 indicating the status of the seatbelt buckle (i.e., latched or unlatched, referred to herein as a first wireless seatbelt status signal 32. The transmitter 30 may be a radio frequency (RF) transmitter configured to transmit the first wireless seatbelt status signal 32 as a modulated RF signal. The electrical signal produced by the piezoelectric element 28 can be used not only to signal the transmitter 30, but can also provide the electrical energy needed to operate the transmitter 30.

The buckle 18 may also include an energy storage device 34 such as a battery or a capacitor coupled to both the piezoelectric element 28 and the transmitter 30. The energy storage device 34 may provide backup power to operate the transmitter 30 in case of a piezoelectric failure. The energy storage device 34 may also provide frequent system updates or change of buckle states by regularly powering up the transmitter 30 while the vehicle ignition is ON so that the transmitter 30 sends the first wireless seatbelt status signal 32 periodically (e.g., every ten seconds), rather than only upon an event triggered by the piezoelectric element 28. The electrical energy harvested during insertion of the tongue 24 into the buckle 18 may also provide a trickle charge to the energy storage device 34.

Additionally or alternatively, the piezoelectric element 28 may use electrical energy harvested during the tongue insertion process to communicate a signal to an electronic control unit (ECU) 36. Based at least in part upon the signal received from the piezoelectric element 28, the ECU 36 may then communicate with the transmitter 30 to send an appropriate wireless seatbelt status signal. In addition to the piezoelectric signal input, the ECU 36 may include one or more additional inputs for receiving signals related to the wireless seatbelt system 10. For example, the buckle 18 may also include a seatbelt switch (SBS) 38 coupled to the ECU 36. When the tongue 24 is securely inserted into the buckle 18, the SBS 38 may change from an unlatched state to a latched state. The SBS 38 may constantly or periodically communicate the actual state of the buckle 18 to the ECU 36. Thus, even when there is no mechanical stress being applied to the piezoelectric element 28 or the piezoelectric element fails, the ECU 36 can know the state of the buckle 18. Accordingly, the first wireless seatbelt status signal 32 transmitted by the transmitter 30 can be based at least in part upon an input to the ECU 36 from the SBS 38.

According to one or more embodiments of the present application, the buckle 18 may receive a signal from a passenger presence detector (PPD) 40. The PPD 40 may be a sensor for determining the presence of an occupant in a seat that corresponds to the wireless seatbelt assembly 12. The physical location of the PPD 40 may depend upon the type of sensor employed, but in most instances, the PPD 40 can be located in or very near the corresponding vehicle seat. The PPD 40 may be any type of occupancy sensor known to one of ordinary skill in the art, such as a pressure sensor, a capacitive sensor, or the like. The PPD 40 may communicate an analog signal to the ECU 36 indicating whether a passenger is present in the corresponding seat. To this end, the ECU 36 may include an analog input for receiving the PPD signal. Alternatively, the buckle 18 may include an analog-to-digital converter 42 disposed in the communication path between the PPD 40 and the ECU 36 for converting an analog PPD signal to a digital signal that can be processed by the ECU 36. In certain embodiments employing the PPD 40, the ECU 36 can determine the information to be relayed wirelessly by the transmitter 30 in the first wireless seatbelt status signal 32 based at least in part upon the SBS 38 and the PPD 40.

While the electrical elements contained in the buckle 18 are described herein as separate components, it should be understood that multiple electrical elements may be combined into a single component without departing from the scope of the present application.

Figure 2:
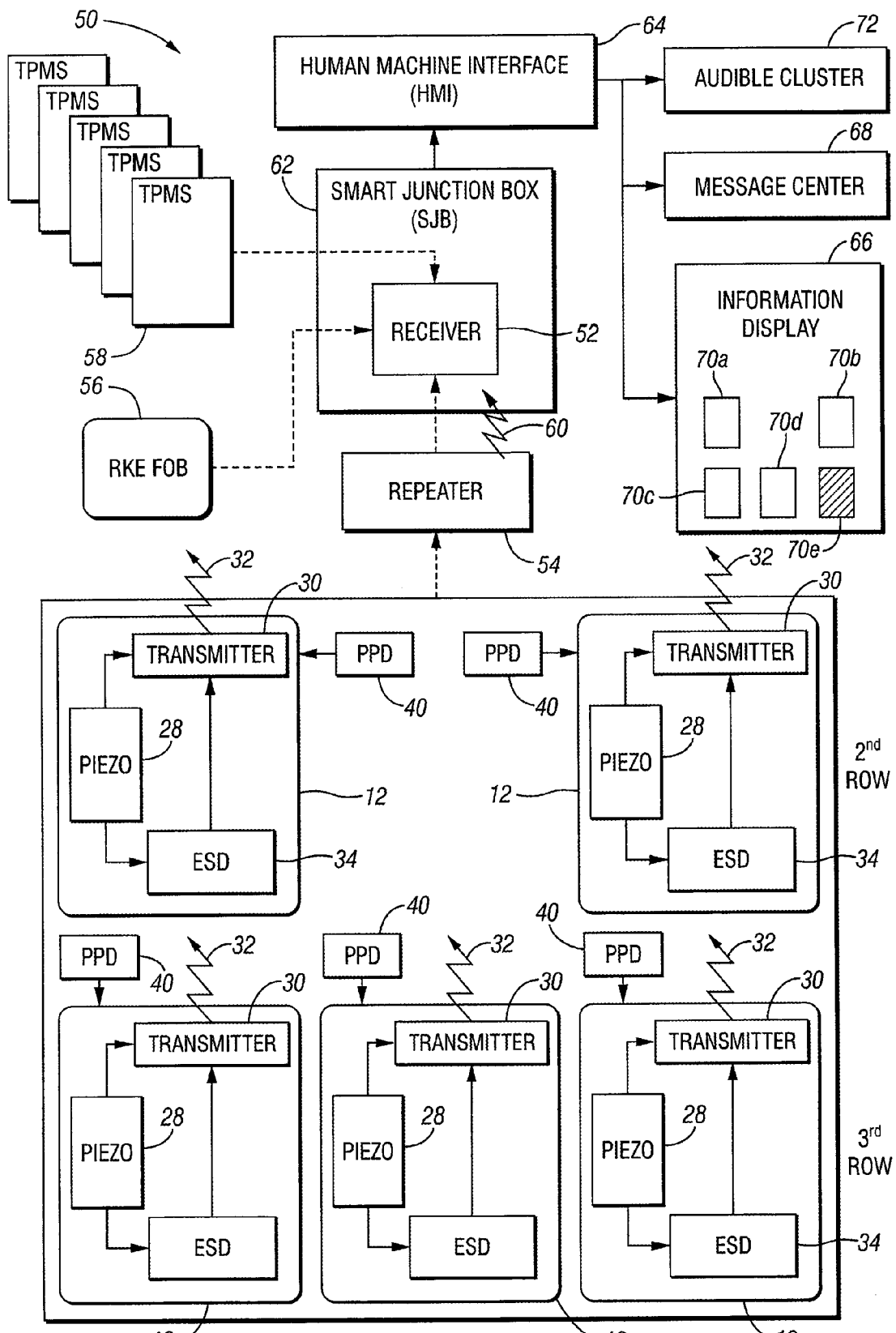
FIG. 2 is a simplified, exemplary diagram of a wireless seatbelt monitoring system according to one or more embodiments of the present application.

Referring now to FIG. 2, wherein like elements are given like reference numerals, a wireless seatbelt monitoring system 50 according to one or more embodiments of the present application is shown. As seen therein, the system 50 may include a plurality of wireless seatbelt assemblies 12. For illustrative purposes, the plurality of wireless seatbelt assemblies 12 may correspond to seats in a second row and a third row of a vehicle, although additional vehicle seats and/or rows of seats may be included without departing from the scope of the present application. The plurality of wireless seatbelt assemblies 12 are shown having a piezoelectric element 28, an energy storage device 34, and a transmitter 30. However, it should be noted that the wireless seatbelt assemblies 12 may include additional circuitry and components such as that shown and described in the buckle of FIG. 1. Each wireless seatbelt assembly 12 may also be coupled to a corresponding PPD 40, as described with respect to FIG. 1. Moreover, each wireless seatbelt assembly 12 may be configured to send its own first wireless seatbelt status signal 32 via its corresponding transmitter 30. The first wireless seatbelt status signal 32 emitted by each transmitter 30 can uniquely identify its associated wireless seatbelt assembly 12 from other seatbelt assemblies (e.g., by assigning a unique frequency to the wireless signal, by encoding a unique identifier into the wireless signal, etc.).

The system 50 may further include a receiver 52 for receiving the first wireless seatbelt status signals, either directly or indirectly through a repeater module 54 as shown in FIG. 2. In certain embodiments, the receiver 52 may be shared with a remote keyless entry (RKE) system. In this regard, the receiver 52 may be configured to receive wireless signals from both an RKE fob 56 and the plurality of wireless seatbelt assemblies 12. Moreover, in vehicles equipped with a tire pressure monitoring system (TPMS), a plurality of TPMS sensors 58, one for each tire, may also communicate a wireless tire pressure signal to the receiver 52. Thus, existing vehicle architecture may be largely employed in implementing the wireless seatbelt monitoring system.

The wireless seatbelt monitoring system 50 may have to compete with the RKE system and the TPMS system since each system may share the same receiver. Thus, the potential exists for RKE fob and TPMS messages to collide with a wireless seatbelt status signal, resulting in a loss of data. Additionally, wireless seatbelt status signals may be ignored while the receiver 52 is receiving RKE fob or TPMS messages. Due to the piezoelectric element 28, the wireless seatbelt assembly 12 may only have one opportunity to transmit the first wireless seatbelt status signal 32. This may be because the energy required from a piezoelectric harvesting element makes the insertion effort at or near the upper specification range of allowed force to send a message. Often, the piezoelectric element can only supply enough energy to send a message from a transmitter in one packet burst. If this signal is lost or ignored due to shared or competing systems, the potential for a failure mode exists. To help prevent this potential failure mode, the system 50 may employ the repeater module 54 referenced above, as shown in FIG. 2.

The repeater module 54 may include a transceiver that can both receive and transmit wireless signals. According to one or more embodiments of the present application, the wireless seatbelt assemblies 12 may be configured to transmit the first wireless seatbelt status signals 32 directly to the repeater module 54, rather than the receiver 52. The frequency of the first wireless seatbelt status signals 32 may be selected so as not to interfere with the frequencies of the RKE or TPMS systems. The repeater module 54 may therefore be configured to receive the modulated RF seatbelt status signals transmitted by the wireless seatbelt assemblies 12 and retransmit the corresponding messages to the receiver 52 in a second wireless seatbelt status signal 60 by shifting the frequency of the first wireless seatbelt status signals up or down. The second wireless seatbelt status signals 60 may then be sent to the receiver 52 by the repeater module 54 several times if necessary. In this regard, the potential for permanent loss of data due to message collisions can be avoided by using the repeater module 54, thus providing for a more robust system without having to introduce an entirely separate or different system architecture.

The repeater module 54 may be located in the middle or rear section of the vehicle's interior in a location relatively close to the plurality of wireless seatbelt assemblies 12. The proximity of the repeater module 54 to the wireless seatbelt assemblies 12 can allow for a smaller piezoelectric harvesting element, thereby reducing the amount of insertion force applied by user when buckling the seatbelt assembly that is necessary to generate an electric signal with sufficient strength to reach the repeater module 54. This is because the message length of the first wireless seatbelt status signal 32 can now be shorter and the output power of the transmitter 30 that is needed to reach the repeater module 54 can now be lessened as compared to transmitting the same wireless signal to an RKE receiver, which is typically mounted farther away.

The receiver 52 may form a part of a smart junction box (SJB) 62, as shown in FIG. 2. In many vehicles, the SJB 62 is the main hub in a vehicle's electrical system, controlling and providing power to various electrical features such as power windows, power door locks, lighting (interior and exterior), instrumentation, the audio system, and the like. The SJB 62 can detect the second wireless seatbelt status signals 60 via the receiver 52 and can determine which seatbelt assembly 12 is associated with the received signal. After the second wireless seatbelt status signal 60 has been processed, the SJB 62 can output a corresponding electrical signal that may be used to inform the driver of the current status of the plurality of wireless seatbelt assemblies 12. Of course, the receiver 52 may be part of a separate or stand alone control module for processing wireless signals received from the wireless seatbelt assemblies, RKE fob, and/or TPMS sensors, directly or indirectly, without departing from the scope of the present invention.

The status of each wireless seatbelt assembly 12 may be communicated to the driver in several ways. For example, the status of the wireless seatbelt assemblies may be communicated to the driver via a human machine interface (HMI) 64. The HMI 64 may function as a digital command center that can allow a driver to monitor and control key vehicle functions and systems. The HMI 64 may include an intelligent instrument panel with an information display 66 and a message center 68. The status of the wireless seatbelt assemblies 12 may be displayed to the driver through the message center 68 in the form of a telltale, text, code, or the like. Additionally or alternatively, the status of the wireless seatbelt assemblies 12 may be communicated to the driver through the information display 66. For example, the information display 66 may graphically depict the vehicle's seating arrangement using a plurality of icons or indicator lights 70*a-e* having a number of states. Each icon or indicator light may correspond to a particular vehicle seat. The state of each icon or indicator light may correspond to the status (e.g., latched or unlatched) of an associated wireless seatbelt assembly 12. For example, each icon or indicator light may be color coded to indicate the latch condition. Further, the state of each icon or indicator light displayed may also depend upon whether an occupant is present in the corresponding vehicle seat. For example, the state of icon 70*e*, as shown in FIG. 2, may indicate that an occupant is present in the corresponding seat, but that the seatbelt assembly 12 is unlatched.

In addition to the visual indicators described above, the status of one or more of the wireless seatbelt assemblies 12 may be audibly communicated to the driver. Accordingly, the system may include an audible cluster 72 to effectuate an audible seatbelt status indication. It should be noted that the status of the wireless seatbelt assemblies 12 may be sent to the information display 66, message center 68, and/or audible cluster 72 directly from the SJB 62 or the receiver 52. In this regard, the system 50 is not dependent upon the presence of the HMI 64 to communicate wireless seatbelt status information to a driver. It should also be noted that the system may be connected to another communication system such as PLC, CAN, LIN, or the like, as stand alone system or as a redundant system.

Figure 3:
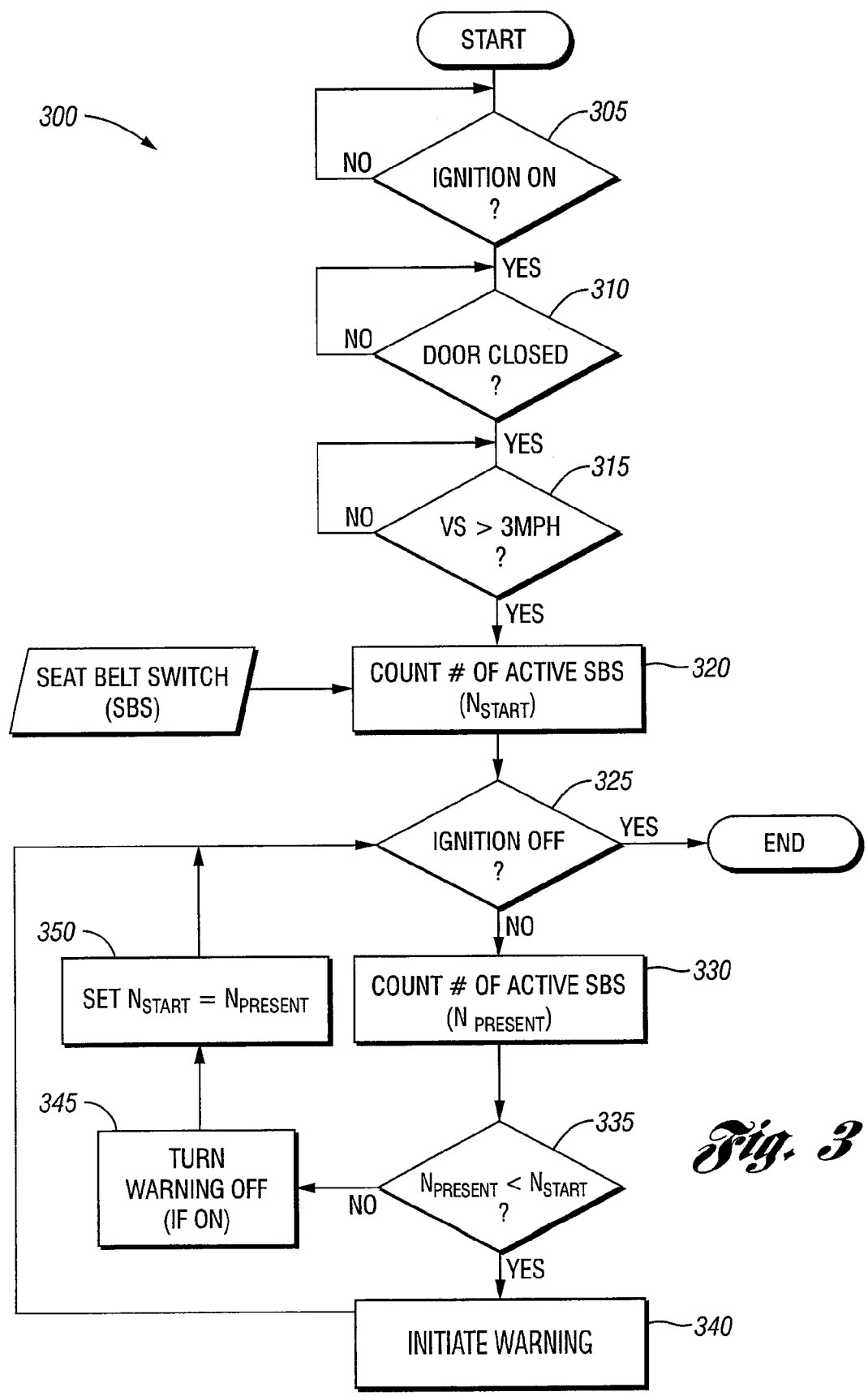
FIG. 3 is a simplified, exemplary flowchart depicting a method for determining and informing a driver of the status of a wireless seatbelt assembly according to one or more embodiments of the present application.

Referring now to FIG. 3, a simplified, exemplary flowchart depicting a method 300 for determining and informing a driver of the status of a wireless seatbelt assembly according to one or more embodiments of the present application is shown. The method of FIG. 3 is an example of a method that may be employed in the absence of an input from a passenger presence detector, such as the PPD 40 in FIGS. 1 and 2. As seen therein, the system may first determine whether the vehicle ignition is ON at step 305. This may include a determination whether the ignition switch is in either the RUN or START position. If the ignition is OFF, the method may return to step 305 and continue to monitor the state of the ignition switch. If, however, it is determined that the vehicle ignition is ON, the system may next determine whether one or more of the vehicle doors are closed, as provided at step 310. For example, the system may want to know whether the driver door is closed, whether a passenger door is closed, whether all vehicle doors are closed, or some combination thereof.

If the relevant door(s) of the vehicle are not closed, the method may return to step 310 and continue to monitor the status of the vehicle doors. If, however, it is determined that the necessary doors are closed, the system may next determine if the vehicle is in motion, as provided at step 315. This determination may be performed in one of several ways. For example, the system may determine that the vehicle is in motion for purposes of the wireless seatbelt monitoring system 50 if the vehicle's speed is greater than 3 miles per hour. Of course, other vehicle speed thresholds may be used without departing from the scope of the present application. Alternatively, the system may determine that the vehicle is in motion for purposes of the wireless seatbelt monitoring system if the vehicle's transmission is shifted out of PARK, or put into one of a plurality of gears including REVERSE. If it is determined that the vehicle is not in motion, the method may return to step 315 and continue to monitor whether the vehicle is in motion. If, however, it is determined that the vehicle is in motion, the method may proceed to step 320.

At step 320, the system may next determine the initial number of wireless seatbelt assemblies 12 in the latched state. In this regard, a number of wireless seatbelt status signals may be received from one or more of the plurality of wireless seatbelt assemblies 12. The wireless seatbelt status signals may be received directly by the receiver 52 or indirectly by way of the repeater module 54. Each wireless seatbelt status signal may include data based upon input from its corresponding seatbelt switch (SBS) 38, which can identify whether the buckle 18 is in the latched state or unlatched state. Accordingly, the number of seatbelt switches 38 initially in the active state ($N_{start}$) can be determinative of the initial number of wireless seatbelt assemblies 12 in the latched state. Once the system determines the initial number of active seatbelt switches, the system may then regularly monitor wireless seatbelt status signals for changes or updates. In doing so, the system may first check to see if the ignition has been turned OFF, as provided at step 325. If the ignition remains ON, the method may proceed to step 330, in which the current number of active (latched) seatbelt switches ($N_{present}$) may be determined based upon the most recently received wireless seatbelt status signals.

The method may then proceed to step 335 where the current number of active seatbelt switches ($N_{present}$) may be compared to the initial number of active seatbelt switches ($N_{start}$). If it is determined that the current number of active seatbelt switches is less than the initial number of active seatbelt switches, the system may conclude that one or more wireless seatbelt assemblies 12 have become unbuckled. In particular, the system may determine that one or more wireless seatbelt assemblies that were initially buckled has become unbuckled. Accordingly, the system may initiate a seatbelt warning at step 340 to alert the driver to a potentially unsafe condition. As previously described, the seatbelt warning may include a visual warning, an audible warning, or both. For example, a visual indication that a seatbelt assembly 12 has become unlatched may be displayed by the message center 68 and/or information display 66. An audible indication that a seatbelt assembly 12 has become unlatched may be announced by the audible cluster 72. Once the seatbelt warning has been initiated, the method may return to step 325 to determine if the ignition has been turned off and receive an update on the number of active seatbelt switches.

On the other hand, if it is determined at step 335 that the current number of active seatbelt switches ($N_{present}$) is not less than the initial number of active seatbelt switches ($N_{start}$), a seatbelt warning may not be initiated and the system may proceed to step 345. At step 345, if a seatbelt warning was previously issued, it may be turned off. The method may then proceed to step 350 in which the initial number of active seatbelt switches can be set equal to the current number of active seatbelt switches ($N_{start}=N_{present}$). If the current number of active seatbelt switches determined at step 330 is equal to the initial number of active seatbelt switches, then $N_{start}$ may remain unchanged. If, perhaps, the current number of active seatbelts switches determined at step 330 is greater than the initial number of active seatbelt switches, then $N_{start}$ may be set to $N_{present}$. In this regard, the system may account for the status of a wireless seatbelt assembly that was latched after the vehicle was initially put in motion. The method may then return to step 325. Returning to step 325, if it is determined that the ignition has been turned OFF, the methodology 300 may end.

Figure 4:
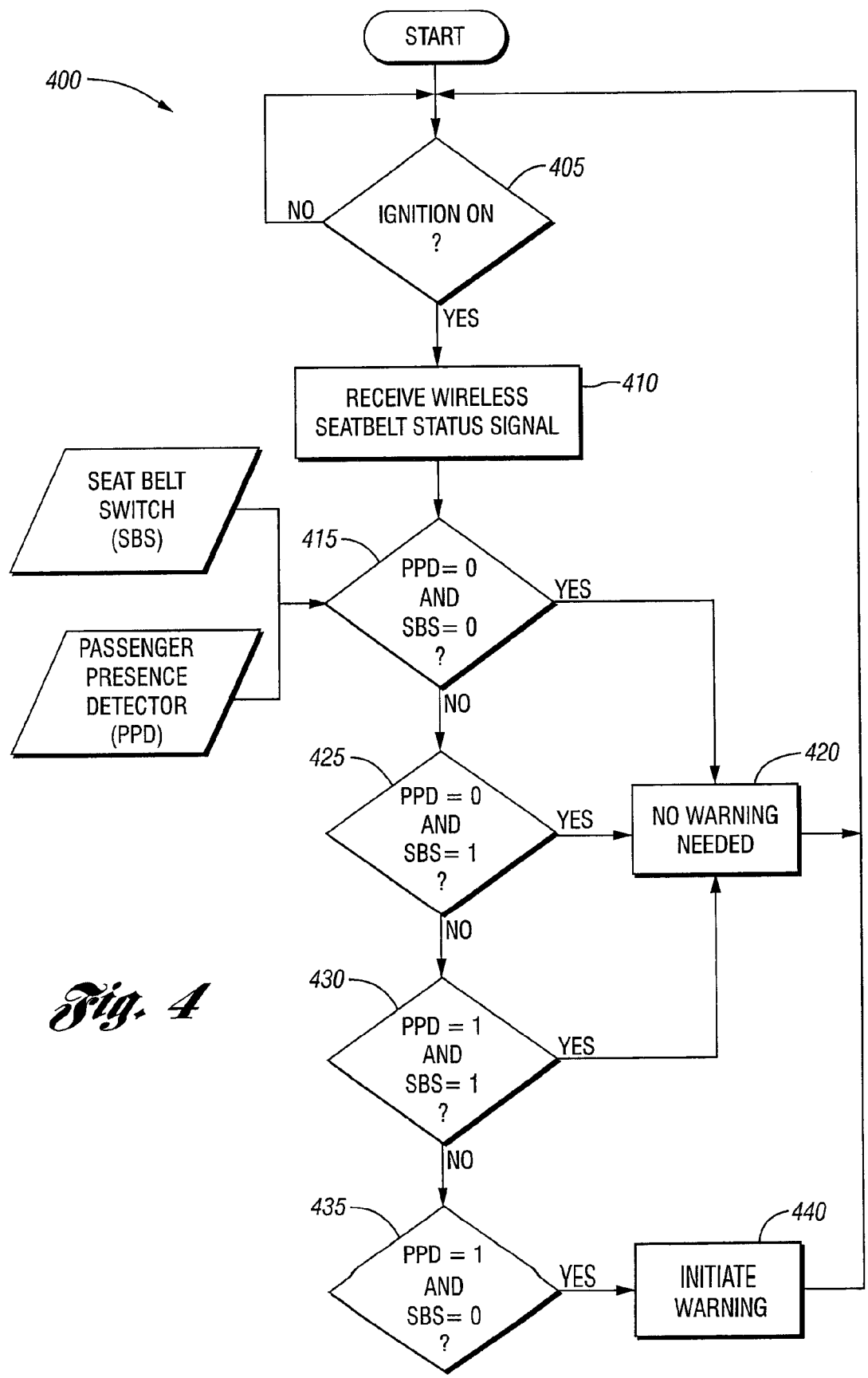
FIG. 4 is a simplified, exemplary flowchart depicting another method for determining and informing a driver of the status of a wireless seatbelt assembly according to one or more embodiments of the present application.

Referring now to FIG. 4, a simplified, exemplary flowchart depicting a method 400 for determining and informing a driver of the status of a wireless seatbelt assembly 12 according to one or more embodiments of the present application is shown. The method of FIG. 4 is an example of a method that may be employed in a system incorporating input from a passenger presence detector, such as the PPD 40 in FIGS. 1 and 2. The method of FIG. 4 may be employed for each wireless seatbelt assembly 12 present in the system. As seen therein, the system may first determine whether the vehicle ignition is ON at step 405. This may include a determination whether the ignition switch is in either the RUN or START position. If the ignition is OFF, the method may return to step 405 and continue to monitor the state of the ignition switch. If, however, it is determined that the vehicle ignition is ON, the system may then receive and process the wireless seatbelt status signal in order to determine the current state of both the wireless seatbelt assembly's seatbelt switch (SBS) 38 and the corresponding passenger presence detector (PPD) 40, as provided at step 410. The current state of the SBS and the PPD may be provided in a message contained in the wireless seatbelt status signal. As previously discussed, the wireless seatbelt status signal may be received by the receiver 52 directly from the transmitter 30 of the wireless seatbelt assembly 12 or, alternatively, it may be received indirectly by way of the repeater module 54.

At step 415, if it is determined that the wireless seatbelt assembly 12 is unlatched (SBS=0), but the passenger seat is not occupied (PPD=0), the system may determine that no seatbelt warning is necessary, as indicated at step 420. Otherwise, the method may proceed to step 425. At step 425, if it is determined that the wireless seatbelt assembly is latched (SBS=1), but the seat is not occupied (PPD=0), the system may again determine that no seatbelt warning is necessary, as indicated at step 420. Otherwise, the method may proceed to step 430. At step 430, if it is determined that the wireless seatbelt assembly is latched (SBS=1) and the passenger seat is occupied (PPD=1), the system may again determine that no seatbelt warning is necessary, as indicated at step 420. Otherwise, the method may proceed to step 435. At step 435, if it is determined that the wireless seatbelt assembly is unlatched (SBS=0), but the passenger seat is occupied (PPD=1), the method may proceed to step 440 to initiate a seatbelt warning. The system may initiate a seatbelt warning at step 440 to alert the driver to a potentially unsafe condition. As previously described, the seatbelt warning may include a visual warning, an audible warning, or both. For example, a visual indication that a seatbelt assembly 12 has become unlatched may be displayed by the message center 68 and/or information display 66. An audible indication that a seatbelt assembly 12 has become unlatched may be announced by the audible cluster 72. Once the seatbelt warning has been initiated, the method may return to step 405 to determine if the ignition has been turned off and receive an update on the status of the wireless seatbelt.

It should be noted that the methods of FIGS. 3 and 4 as described herein are exemplary only, and that the functions or steps of the methods could be undertaken other than in the order described and/or simultaneously as may be desired, permitted and/or possible.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed:

1. A seatbelt status indication method comprising:
   at a repeater module, receiving a first wireless seatbelt status signal (WSSS) from a plurality of seatbelts indicating a latch condition of at least one of the plurality of seatbelts;
   transmitting a second WSSS to a receiver a plurality of times, the second WSSS corresponding to the first WSSS; and
   indicating the latch condition of the plurality of seatbelts based at least in part upon the second WSSS.

2. The method of claim 1, wherein the first WSSS further indicates the presence of an occupant in a seat associated with one of the plurality of seatbelts.

3. The method of claim 2, wherein the second WSSS is transmitted from the repeater module to the receiver at a different frequency than the first WSSS.

4. The method of claim 2, wherein the step of indicating the latch condition includes displaying the latch condition of the plurality of seatbelts via an information display; using a plurality of indicators graphically depicting a vehicle seating arrangement, each of the plurality of indicators associated with one of the plurality of seatbelts and having at least a latched state and an unlatched state corresponding to the latch condition.

5. The method of claim 2, wherein the step of indicating the latch condition includes announcing the latch condition of the plurality of seatbelts audibly.

6. A wireless seatbelt monitoring system comprising:
   at least one seatbelt including a transmitter configured to transmit a first wireless seatbelt status signal (WSSS) indicating a latch condition of the at least one seatbelt;
   a repeater module configured to receive the first WSSS and transmit a second WSSS a plurality of times, the second WSSS corresponding to the first WSSS;
   a receiver configured to receive the second WSSS from the repeater module; and
   an indicator in communication with the receiver configured to convey the latch condition of the at least one seatbelt based at least in part upon the second WSS.

7. The system of claim 6, wherein the transmitter is a radio frequency (RF) transmitter.

8. The system of claim 7, wherein the second WSSS is transmitted from the repeater module to the receiver at a different frequency than the first WSSS.

9. The system of claim 8, wherein the receiver is shared by a remote keyless entry (RKE) system.

10. The system of claim 9, wherein the receiver is further shared by a tire pressure monitoring system (TPMS).

11. The system of claim 6, wherein the at least one seatbelt includes a buckle affixed to a first strap and a tongue affixed to a second strap, the tongue configured to be inserted into the buckle securing the second strap to the first strap, the buckle including a piezoelectric element operable to generate an electrical signal having energy sufficient to power a transmitter, the transmitter configured to transmit the first WSSS based at least in part upon the electrical signal generated by the piezoelectric element.

12. The system of claim 11, wherein the buckle further includes an energy storage device operable to provide backup power to the transmitter, the energy storage device electrically coupled to the piezoelectric element for receiving electrical charge from the piezoelectric element.

13. The system of claim 11, wherein the buckle further includes a seatbelt switch electrically coupled to the transmitter, the seatbelt switch having a latched state and an unlatched state corresponding to the latch condition of the at least one seatbelt.

14. The system of claim 13, wherein the first WSSS is based at least in part upon the state of the seatbelt switch.

15. The system of claim 14, further comprising a passenger presence detector coupled to the at least one seatbelt configured to detect the presence of an occupant in a seat associated with the at least one seatbelt.

16. The system of claim 15, wherein the first WSSS is based at least in part upon the passenger presence detector.

17. The system of claim 16, wherein the seatbelt switch and passenger presence detector are electrically coupled to the transmitter through an electronic control unit electrically disposed therebetween.

18. The system of claim 6, wherein the indicator is a visual indicator provided in an information display having a plurality of indicator elements depicting a vehicle seating arrangement, the plurality of indicator elements associated with a plurality of seatbelts including the at least one seatbelt and having at least a latched state and an unlatched state corresponding to the latch condition of each of the plurality of seatbelts.

19. The system of claim 6, wherein the indicator is an audible indicator.

20. A wireless seatbelt monitoring system comprising:
   at least one wireless seatbelt assembly including a buckle affixed to a first strap and a tongue affixed to a second strap, the tongue configured to be inserted into the buckle securing the second strap to the first strap, the buckle including a piezoelectric element operable to convert mechanical stress applied by the tongue during insertion into an electrical signal having energy sufficient to power a transmitter, the transmitter configured to transmit a first wireless seatbelt status signal based at least in part upon the electrical signal generated by the piezoelectric element, the first wireless seatbelt status signal indicating the status of the buckle associated with the at least one wireless seatbelt assembly;
   a repeater module configured to receive the first wireless seatbelt status signal and transmit a second wireless seatbelt status signal a plurality of times, the second wireless seatbelt status signal corresponding to the first wireless seatbelt status signal;
   a receiver configured to receive the second wireless seatbelt status signal from the repeater module; and
   an indicator in communication with the receiver, the indicator configured to inform the driver whether the at least one wireless seatbelt assembly is latched or unlatched based at least in part upon the second wireless seatbelt status signal.

* * * * *